Oct. 16, 1934.                F. X. DOUBLER                1,976,709
                    MANUALLY OPERATED ART STITCHER
                         Filed May 22, 1933            2 Sheets-Sheet 1
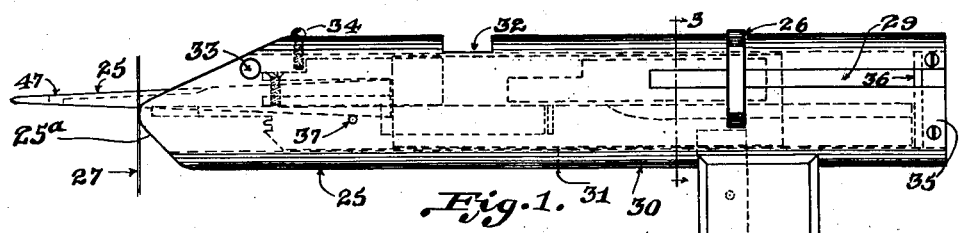
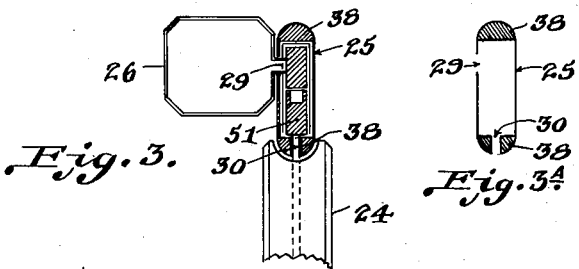
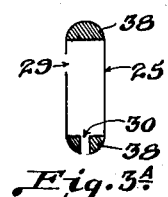
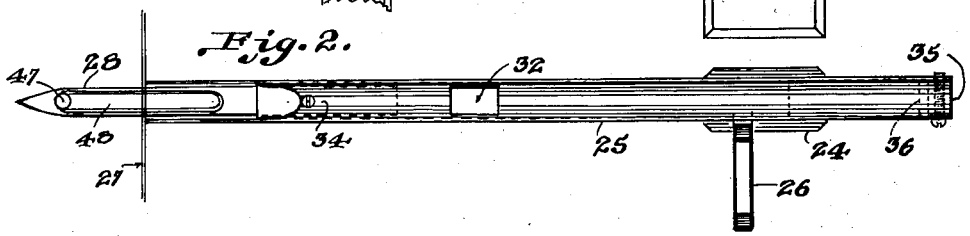
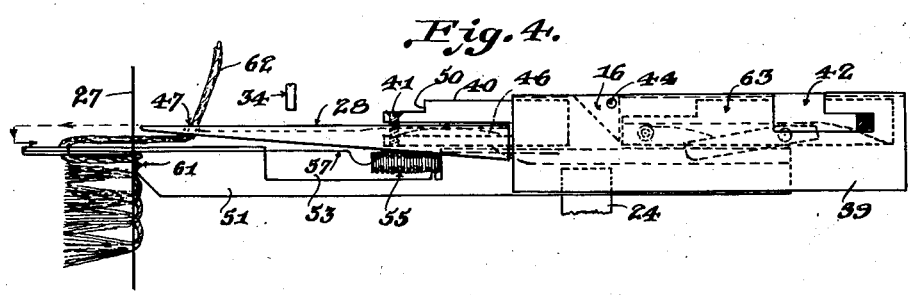
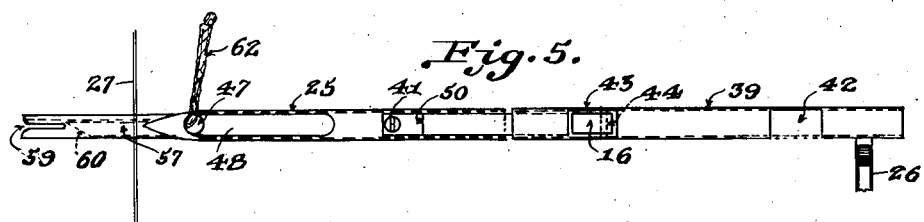
INVENTOR.
F. X. Doubler
BY Seymour & Bright
ATTORNEYS Oct. 16, 1934.  F. X. DOUBLER  1,976,709
MANUALLY OPERATED ART STITCHER
Filed May 22, 1933  2 Sheets-Sheet 2
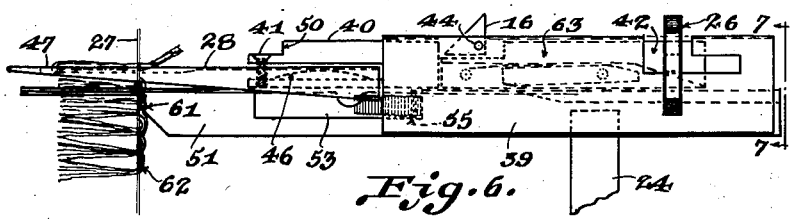 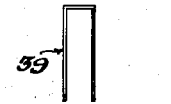
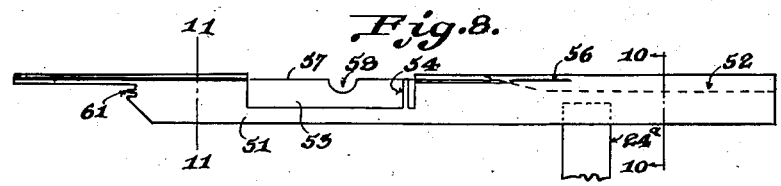 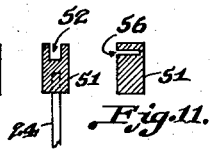
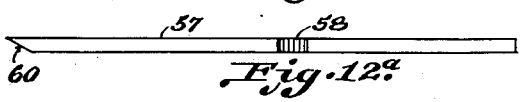
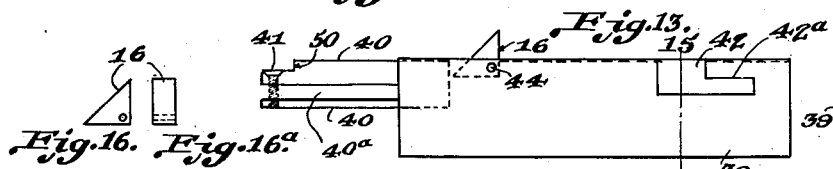 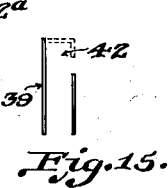
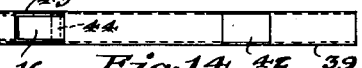
INVENTOR.
F. X. Doubler
BY
ATTORNEYS Patented Oct. 16, 1934

1,976,709

UNITED STATES PATENT OFFICE 1,976,709

MANUALLY OPERATED ART STITCHER

Francis X. Doubler, Cleveland, Ohio

Application May 22, 1933, Serial No. 672,302

14 Claims. (Cl. 112—80)

This invention relates to improvements in art stitchers, and more particularly to a novel art stitcher adapted to be operated by hand.

The primary object of the invention is to provide an art stitcher or rug needle to be used in making hooked rugs and similar articles, or any article requiring loops or clipped loops of any design or pattern upon a suitable base, such as burlap. The material used for the loops is yarns or flosses.

Another object of the invention is to furnish an art stitcher comprising a yarn needle and a knife needle which are alternately reciprocated and in which movement of the yarn needle functions to actuate the knife of the knife needle.

With the foregoing objects outlined and with other objects in view which will appear in the description proceeds, the invention consists in the novel features hereinafter described in detail, illustrated in the accompanying drawings, and more particularly pointed out in the appended claims.

In the drawings,

Fig. 1 is a side elevation of the improved art stitcher, showing the yarn needle projected through the fabric.

Fig. 2 is a top plan view of the same.

Fig. 3 is a transverse vertical sectional view taken on the line 3—3 of Fig. 1.

Fig. 3a is a similar view of the case of the device, taken on the same line.

Fig. 4 is a side view of the mechanism with the case removed, and showing the knife needle projected through the fabric, and the yarn needle retracted.

Fig. 5 is a top plan view of the structure shown in Fig. 4.

Fig. 6 is a view similar to Fig. 4, but showing both needles projected.

Fig. 7 is an end view of the inner case or sleeve of the yarn needle; this view being taken on the line 7—7 of Fig. 6.

Fig. 8 is a side elevation of the knife needle.

Fig. 9 is a top plan view of the knife needle.

Figs. 10 and 11 are vertical transverse sectional views of the same, taken respectively on the lines 10—10 and 11—11 of Fig. 8.

Figs. 12 and 12a are side and top plan views respectively of the knife of the knife needle.

Figs. 13 and 14 are a side elevation and top plan view respectively of the butt end portion of the yarn needle.

Fig. 15 is a sectional view of the butt end of the yarn needle, taken on the line 15—15 of Fig. 13.

Figs. 16 and 16a are a side elevation and plan view respectively of a bob or detent forming part of the yarn needle.

Figs. 17 and 18 are a side view and top plan view respectively of the point end portion of the yarn needle.

Fig. 19 is an end view of the same, taken on the line 19—19 of Fig. 17.

Fig. 20 is a sectional view of a detail taken on the line 20—20 of Fig. 17.

Fig. 21 is a top plan view of a knife actuating slide block which forms part of the butt end portion of the yarn needle.

Fig. 22 is a side elevation of the same, with a part in section.

Fig. 23 is a transverse vertical sectional view of a detail taken on the line 23—23 of Fig. 22.

Referring first to Figs. 1 to 3a inclusive, it will be noted that the casing 25 of the device is of tubular form, and is provided at its front end with a nose 25a which will glide smoothly over the fabric 27 to be operated upon, and will permit the operator to view the stitches as he works.

The upper and lower portions of the casing are thickened as shown at 38, and its rear end portion is provided with a side slot 29 and a bottom slot 30. The side slot permits reciprocation of a handle 26, while the bottom slot permits reciprocation of a longer handle 24. While the nose of the casing engages the fabric, the operator actuates the device by reciprocating the handle 26 with his left hand, and the handle 24 by his right hand.

The yarn needle is illustrated in detail in Figs. 13 to 20 inclusive, and it is shown assembled with the other movable parts of the mechanism in Figs. 4 to 7 inclusive. Such needle includes a butt end portion 39 which is in the form of a sleeve having an open bottom. In other words, the member 39 is of inverted U-shape, and it is provided with a front aperture 43 and a rear aperture 42, the latter opening through the top of said butt and having a rearwardly extending slot 42a.

A socket or fork 40 has its rear end rigidly connected to the front end of the part 39, and is adapted to receive the point portion 28 of the yarn needle. The rear end of this portion is of inverted U-shape, and it fits into the slot 40a of the socket, and is held in place by a screw 41 which passes through the arms of the socket as well as through a hole 45 in the point portion of the needle.

In order that the point portion of the needle may float or rock relatively to the socket 40, a leaf spring 46 is interposed between the upper surface of the lower arm of the socket and the under surface of the top portion of the needle point, as clearly shown in Figs. 4 and 6.

From Figs. 17, 18 and 20, it may be seen that the point portion of the needle has a trough 48 in its upper surface which communicates with a hole 47 in the needle point that receives the yarn 62, which in operation is also threaded through a hole 33 in the nose end of the casing.

The part 39 of the yarn needle is made hollow so as to form a housing for a slide block 63 which is used to actuate the knife of the knife needle, hereinafter referred to. This slide block is shown detached in Figs. 21 to 23 inclusive, and it is rigidly connected to the handle 26 which projects through the slot 42a of the yarn needle butt, as well as through the side slot 29 of the casing. This slide block has a groove 64 in its under surface in which a detent or finger 68 is rockably mounted on a pin 69. A leaf spring 66 is also positioned in this groove and has one of its ends anchored to a pin 67 of the slide block, and its other end bearing upon the detent or finger 68.

The butt end portion of the yarn needle also has a detent or bob 16 which is rockably mounted on a pin 44. This bob is normally in retracted position, as shown in Fig. 4, and it can only move upwardly into projected position when the bob comes into registration with a hole 32 in the top of the casing. Consequently, during the greater portion of the forward movement of the yarn needle, the front end of the slide block 63 will be engaging the bob 16, and therefore the handle 26 may be used to project the yarn needle forward. However, as soon as a surface 50 of the socket of the yarn needle comes into engagement with a stop pin 34 of the casing, the yarn needle can go no further forward, but the slide block 63, under the influence of the handle 26, can continue forward as the bob 16 is swung into uppermost position through the hole 32. It is this movement of the slide block 63 relatively to the butt end portion 39 of the yarn needle, which is utilized to actuate the knife of the knife needle, which will now be described.

The knife needle is shown in detail in Figs. 8 to 12a inclusive and it will be noted that it is positioned in the casing immediately below the yarn needle. The knife needle consists of a body portion 51 having a shank 24a which projects through the bottom slot 30 of the casing and is secured to the handle 24.

The butt end portion of the knife needle has a groove 52 in its upper surface to receive the finger or detent 68 of the slide block, and it will be noted that the forward end of the groove 52 inclines upwardly so as to guide the forward end of the detent 68 upwardly to move the detent in a clock-wise direction for a purpose hereinafter explained.

A relatively thin knife 57 slidably fits in a groove 56 in the side of the knife needle, and it will be noted that the groove extends rearwardly and merges into the groove 52. The forward end of the knife is cut away to provide a sharp point 60 which in operation is adapted to move into a notch 59 in the forward end of the knife needle for severing the yarn while it is held in said notch.

The knife is normally held in a retracted position by a coil spring 55 which has one of its ends secured to a kink 58 in the knife, and its other end secured to a post 54 forming part of the body of the knife needle. A notch or cut-away portion 53 in the knife needle permits reciprocation of the kinked portion of the knife.

A roughened surface 61 at the forward end portion of the knife needle acts as a tensioning element to hold the yarn against the fabric while a loop is being clipped.

Assuming that the knife needle is in forward position, with the notch 59 engaging a loop of the yarn, and the tension element 61 holding the yarn against movement, it will be understood that if the yarn needle at this time is moved forward from retracted position, the detent 68 of the slide block will engage the rear end of the knife 57 and push the latter forward so that its point will shear the loop held in the notch 59. As soon as the knife has been pushed forward to the limit of its movement, the front end of the detent 68 will slide up the inclined end of the groove 52 and over the rear end of the knife 57, so that the latter will then be snapped back into retracted position under the influence of the spring 55. Later, when the yarn needle is again retracted, the spring 66 of the slide block will move the detent 68 down into the groove 52 of the knife needle, as soon as the end of the detent passes off the rear end of the knife 57.

The screw 34 acts to limit the forward movement of the internal mechanism, and rearward movement is limited by a plug 35 which is secured to the rear end of the casing by screws or the like, and is provided on its front face with a shock absorber or buffer 36. Forward movement of the handle 24 is limited by the abutment surface 31 at the front end of the slot 30.

*Operation*

In operating this device, it is only necessary to give each handle its to and fro stroke alternately; first the left hand its to and fro stroke, then the right hand its to and fro stroke, as the needles do the rest. The stitcher leaves the yarn on the finished side all clipped and of even height, and as the device is of simple construction, it can be operated by most anyone with relatively great speed; and those skilled in the use of the instrument may make as many as 140 stitches per minute.

For operating purposes, the fabric, such as a piece of burlap 27 having a suitable pattern printed thereon, is stretched tightly on a suitable frame in an upright position. The operator occupies a chair in front of the frame, and follows the design on the pattern with the instrument. To start the work, the yarn is first put through the eye 33 (Fig. 1), then through the eye 47 of the yarn needle, and pulled through about one inch so that the first stitch will clip. The next step is to penetrate the pattern with the yarn needle while the latter is in projected position, as shown in Figs. 1 and 2. This can be best accomplished with the right hand grasping the long handle 24 while the thumb of the right hand is held against the handle 26, and the latter is at the forward end of its slot 29. When penetration has been made in this manner, the handle 26 is grasped by the left hand, and the handle 24 is pulled down with a slightly greater pressure. This causes the loop holder or knife needle to move into the groove or channel (Fig. 19) of the yarn needle, so that the forward end of the knife needle will go through the hole in the fabric previously made by the point of the yarn needle when the handle 24 is pushed forwardly to project the knife needle. As the result, the loop of the yarn pushed through by the yarn needle will now be engaged by the notch 59 of the knife needle, and at this time the tension element 61 holds the stitch firmly against the fabric, as shown in Fig. 6. Now, while pulling slightly downwardly with the right hand, retract the handle 26, and this causes the yarn needle to be withdrawn. As soon as its point has cleared the fabric, it will spring upwardly the length of a new stitch, due to the action of the spring 46. Then the left hand is again moved forward to cause the yarn needle to penetrate the fabric, and as the end of the slide block 63 is against the bob 16, and the latter is in lowermost position, the yarn needle will move forwardly until its stop surface 50 strikes the screw 34 and brings the bob 16 in position to pop out of the hole 32, due to the pressure of the slide block. At this time, the detent 68 has met the rear end of the blade 57, and while the yarn needle cannot go farther, the slide block and detent 68 continue and take along the blade 57 which in turn severs the yarn held in the notch 59. As soon as the arm 68 passes over the rear end of the blade, due to the incline at the front of the groove 62, the spring 55 snaps the blade back into retracted position, completing one cycle. Now the knife needle is pulled back into the casing by the right hand engaging the handle 24 and then pushed down with very slightly greater pressure on the end of the handle. This causes the knife needle to step forward into the groove 49 of the yarn needle and follow through the pattern in the same hole made by the yarn needle, and on the inside of the loop already formed by the yarn needle.

As the point of the knife must be kept very sharp, it will be noted that it can be reached for sharpening without dismantling the mechanism. To accomplish this, it is only necessary to move the knife needle forward to its projected position, and to then insert a pin through the hole 37 in the case. At this time, the kink 58 of the blade will be in register with the hole, so the pin will hold the knife in projected position while the handle 24 is retracted for the purpose of withdrawing the knife needle into retracted position. Obviously, at such time, the sharp end of the knife will project beyond the notch 59 and may be readily sharpened.

While I have disclosed what I now consider to be a preferred embodiment of the invention in such manner that the same may be readily understood by those skilled in the art, I am aware that changes may be made in the details disclosed, without departing from the spirit of the invention, as expressed in the claims.

What is claimed and desired to be secured by Letters Patent is:

1. An art stitcher comprising a casing, a yarn needle and a knife needle each mounted for lengthwise reciprocation in the casing and having pointed ends adapted to be projected from one end of the casing, a handle for actuating each needle, a knife forming part of the knife needle, and means actuated by movement of the yarn needle for moving the knife in one direction.

2. An art stitcher comprising a casing, a yarn needle and a knife needle each mounted for lengthwise reciprocation in the casing and having pointed ends adapted to be projected from one end of the casing, a handle for actuating each needle, a knife forming part of the knife needle, means actuated by movement of the yarn needle for moving the knife in one direction, and means for automatically retracting the knife in the opposite direction.

3. An art stitcher comprising a casing, a yarn needle and a knife needle mounted for reciprocation in the casing and having pointed ends adapted to be projected from one end of the casing, a handle for actuating each needle, a knife forming part of the knife needle, means actuated by movement of the yarn needle for moving the knife in one direction, and a spring for retracting the knife in the opposite direction.

4. An art stitcher comprising a casing, a yarn needle and a knife needle mounted for reciprocation in the casing and having pointed ends adapted to be projected from one end of the casing, a handle for actuating each needle, a knife forming part of the knife needle, means actuated by movement of the yarn needle for moving the knife in one direction, said yarn needle including a fork-shaped socket member, a point portion extending into the socket member, means for securing the point portion to the socket member, and resilient means between the socket member and point portion to permit the point portion to yield relatively to the socket member.

5. An art stitcher comprising a casing, a yarn needle and a knife needle mounted for reciprocation in the casing and having pointed ends adapted to be projected from one end of the casing, a handle for actuating each needle, a knife forming part of the knife needle, and means actuated by movement of the yarn needle for moving the knife in one direction, said yarn needle having a sleeve member at its butt end, a slide block movable in said sleeve member, said slide block forming a portion of the means for operating the knife from the yarn needle.

6. An art stitcher comprising a casing, a yarn needle and a knife needle mounted for reciprocation in the casing and having pointed ends adapted to be projected from one end of the casing, a handle for actuating each needle, a knife forming part of the knife needle, means actuated by movement of the yarn needle for moving the knife in one direction, and a tension element movable with the knife needle and adapted to impinge against the yarn during the operation of said knife.

7. An art stitcher comprising a casing, a yarn needle and a knife needle mounted for reciprocation in the casing and having pointed ends adapted to be projected from one end of the casing, a handle for actuating each needle, a knife forming part of the knife needle, and means actuated by movement of the yarn needle for moving the knife in one direction, said knife needle having a groove in which the knife slides, and another groove merging into the first mentioned groove and adapted to receive a part of the means for operating the knife from the yarn needle.

8. An art stitcher comprising a juxtaposed yarn needle and knife needle, means for alternately reciprocating said needles, a reciprocating knife carried by the knife needle, and a member on the yarn needle engageable with the knife for projecting the latter.

9. An art stitcher comprising a juxtaposed yarn needle and knife needle, means for alternately reciprocating said needles, a reciprocating knife carried by the knife needle, and a member on the yarn needle engageable with the knife for projecting the latter, said knife needle having a groove in which said member operates.

10. An art stitcher comprising juxtaposed yarn and knife needles, manually operated means for alternately reciprocating said needles, the knife needle having a groove in one side thereof, a knife mounted for reciprocation in said groove, said knife needle having a second groove in the upper surface thereof, and a movable member connected to the yarn needle and adapted to work in the second groove for moving the knife in one direction.

11. An art stitcher comprising juxtaposed yarn and knife needles, manually operated means for alternately reciprocating said needles, the knife needle having a groove in one side thereof, a knife mounted for reciprocation in said groove, said knife needle having a second groove in the upper surface thereof, a movable member connected to the yarn needle and adapted to work in the second groove for moving the knife in one direction, and a spring for moving the knife in the opposite direction.

12. An art stitcher comprising a casing, juxtaposed yarn and knife needles slidably mounted in the casing, manually operated means for alternately reciprocating said needles, a slide block associated with the yarn needle, a detent movably connected to the yarn needle and held in one position by the casing for limiting forward movement of the slide block relatively to the yarn needle during a portion of the movement of the latter, said casing having means for releasing said detent to permit the slide block to move forwardly relatively to the yarn needle, said knife needle having a movable knife, and means actuated by the slide block for actuating said knife.

13. An art stitcher comprising a casing, juxtaposed yarn and knife needles slidably mounted in the casing, manually operated means for alternately reciprocating said needles, a slide block associated with the yarn needle, a detent movably connected to the yarn needle and held in one position by the casing for limiting forward movement of the slide block relatively to the yarn needle during a portion of the movement of the latter, said casing having means for releasing said detent to permit the slide block to move forwardly relatively to the yarn needle, said knife needle having a movable knife, means actuated by the slide block for actuating said knife, and means on the casing for limiting forward and rearward movement of both needles.

14. An art stitcher comprising a tubular casing, juxtaposed yarn and knife needles slidably mounted in the casing, manually operated means for alternately reciprocating said needles, said yarn needle having a sleeve at its butt portion provided with a slot, the casing having a slot aligned with the slot of the sleeve, a slide block mounted for reciprocation in the sleeve and connected to a portion of said manually operated means, a knife forming part of the knife needle, and a movable member carried by the slide block and engageable with the knife for moving the latter in one direction.

FRANCIS X. DOUBLER.